United States Patent [19]

Lee, Jr.

[11] 4,166,812

[45] Sep. 4, 1979

[54] FILLED COMPOSITIONS OF A POLYPHENYLENE ETHER RESIN AND RUBBER-MODIFIED ALKENYL AROMATIC RESINS

[75] Inventor: Gim F. Lee, Jr., Albany, N.Y.

[73] Assignee: General Electric Company, Pittsfield, Mass.

[21] Appl. No.: 838,675

[22] Filed: Sep. 30, 1977

[51] Int. Cl.$^2$ .................. C08K 3/34; C08L 23/00; C08L 51/08; C08L 53/02

[52] U.S. Cl. ................ 260/42.47; 260/37 R; 260/45.7 R; 260/45.7 P; 260/45.7 S; 260/45.75 B; 260/45.9 NP; 260/874; 260/876 R; 260/876 B; 260/897 A; 525/68; 525/52

[58] Field of Search .............. 260/874, 876 R, 876 B, 260/42.47, 897 A, 37 R, 45.7 R, 45.7 P, 45.7 S, 45.75 B, 45.9 NP

[56] References Cited

U.S. PATENT DOCUMENTS

| | | | |
|---|---|---|---|
| 3,383,435 | 5/1968 | Cizek | 260/874 |
| 3,658,945 | 4/1972 | Nakashio et al. | 260/876 R |
| 3,943,191 | 3/1976 | Cooper et al. | 260/876 R |

Primary Examiner—J. Ziegler
Attorney, Agent, or Firm—Morgan, Finnegan, Pine, Foley & Lee

[57] ABSTRACT

Novel compositions are disclosed which include a polyphenylene ether resin, a rubber-modified alkenyl aromatic resin, and aluminum silicate. Also included within the scope of this invention are flame-retardant compositions of said polyphenylene ether resin, said rubber-modified alkenyl aromatic resin, and said aluminum silicate.

30 Claims, No Drawings

FILLED COMPOSITIONS OF A POLYPHENYLENE ETHER RESIN AND RUBBER-MODIFIED ALKENYL AROMATIC RESINS

This invention relates to improved compositions of a polyphenylene ether resin, a rubber-modified alkenyl aromatic resin, and aluminum silicate. Flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,499; Blanchard et al., U.S. Pat. No. 3,219,626; Laakso et al. U.S. Pat. No. 3,342,892; Borman, U.S. Pat. No. 3,344,116; Hori et al., U.S. Pat. No. 3,384,619; Faurote et al., U.S. Pat. No. 3,440,217; and disclosures relating to metal-based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. Cizek, U.S. Pat. No. 3,383,435 discloses polyphenylene ether-styrene resin compositions. All of the above-mentioned disclosures are incorporated herein by reference.

The term "alkenyl aromatic resin" includes polymers and copolymers of styrene, alpha methyl styrene, chlorostyrene, ethylvinylbenzene, divinylbenzene, vinyl naphthalene, and the like.

The term "EPDM" includes rubbery interpolymers of a mixture of mono-olefins and a polyene. Preferred types are those rubbery interpolymers of ethylene, an alpha-olefin, and a polyene. Rubbery interpolymers of ethylene, propylene, and a polyene are especially preferred.

In the prior art, rubber-modified styrene resins have been admixed with polyphenylene ether resins to form compositions that have modified properties. The Cizek patent, U.S. Pat. No. 3,383,435, discloses rubber-modified styrene resinpolyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

Nakashio et al., U.S. Pat. No. 3,658,945 discloses that from 0.5 to 15% by weight of an EPDM-modified styrene resin may be used to upgrade the impact strength of polyphenylene ether resins. In Cooper et al., U.S. Pat. No. 3,943,191 it is disclosed that when the highly unsaturated rubber used in compositions of the type disclosed by Cizek, is replaced with EPDM rubber that has a low degree of residual unsaturation, the thermal oxidative stability and color stability are improved.

Polyphenylene ether resin compositions can contain fillers to result in cost savings, increased modulus, and decreased shrinkage. However, these advantages are usually obtained at the expense of a significant reduction in toughness, as measured by elongation or impact strength.

It has now been unexpectedly found that a composition of a polyphenylene ether resin, a rubber-modified alkenyl aromatic resin, and an aluminum silicate filler, is a very useful thermoplastic molding material having good ductility and good toughness, as measured by elongation or impact strength.

It is, therefore, a primary object of this invention to provide improved compositions that are based on polyphenylene ether resins, rubber-modified alkenyl aromatic resins, and a mineral filler.

Another object of this invention is to provide molding compositions and molded articles that are based upon a polyphenylene ether resin, a rubber-modified alkenyl aromatic resin, and an aluminum silicate filler and that have improved retention of toughness, or, in other words, an improved retention of stiffness, with less loss in toughness.

It is also an object of this invention to provide the above-described, improved molding compositions in flame-retardant embodiments.

DESCRIPTION OF THE INVENTION

The above-mentioned advantages and objects and others will be readily apparent to those skilled in the art by the following compositions.

Preferred types will include thermoplastic compositions which comprise:

(a) from about 1 to 99 parts by weight of a polyphenylene ether resin;

(b) from about 99 to 1 parts by weight of a rubber-modified alkenyl aromatic resin; and (c) up to about 50 parts by weight of a mineral filler.

The preferred polyphenylene ethers are of the formula:

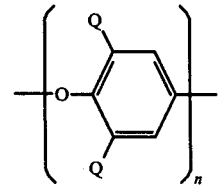

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly (2,6-dimethyl-1,4-phenylene) ether.

The alkenyl aromatic resin should have at least 25% of its units derived from an alkenyl aromatic monomer of the formula

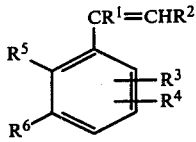

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, chlorostyrene, α-methylstyrene, vinylxylene, divinylbenzene, vinyl naphthalene, and vinyltoluene.

The alkenyl aromatic monomer may be copolymerized with materials such as those having the general formula

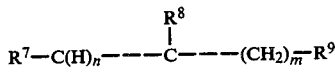

wherein the dotted lines each represent a single or a double carbon to carbon bond; $R^7$ and $R^8$ taken together represent a

linkage; $R^9$ is selected from the group consisting of hydrogen, vinyl, alkyl of from 1 to 12 carbon atoms, alkenyl of from 1 to 12 carbon atoms, alkylcarboxylic of from 1 to 12 carbon atoms, and alkenylcarboxylic of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and monochloropolystyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. No. 2,971,939, U.S. Pat. No. 3,336,267, and U.S. Pat. No. 2,769,804, all of which are incorporated herein by reference.

The alkenyl aromatic resins are modified by rubber such as polybutadiene or EPDM rubbers, that is, rubbery interpolymers comprising mixtures of mono-olefins and a polyene, including those prepared from ethylene, an alpha-olefin, and a polyene. Preferred types comprise 10–90 mole percent of ethylene, 10–90 mole percent of an alpha-olefin containing 3 to 16 carbon atoms, and 0.1–12 mole percent of a polyene that is a non-conjugated cyclic or open-chain diene having 5 to 20 carbon atoms. Especially preferred are those alpha-olefins having 3 to 10 carbons atoms and non-conjugated cyclic or open-chain dienes having 5 to 10 carbon atoms.

Useful EPDM rubbers include the ethylene-propylene-ethylidene norbornene terpolymer and those described in Ritchie, *Vinyl and Allied Polymer*, Vol. 1, Page 121 (1968), which is incorporated herein by reference. The preferred EPDM rubbery interpolymers are those comprised of ethylene, propylene, and 5-ethylidene-2-norbornene; of ethylene, propylene, and 1,4-hexadiene; and of ethylene, propylene, and dicyclopentadiene. Preferred modified alkenyl aromatic resins will include from about 4 to about 25% by weight of rubbery interpolymer.

The rubber-modified alkenyl aromatic resin may be prepared by dissolving the rubber in the alkenyl aromatic monomer and polymerizing the mixture, preferably in the presence of a free-radical initiator, until about 90–100% by weight of the alkenyl aromatic monomer has reacted to form said rubber-modified alkenyl aromatic resin.

The particular mineral fillers useful in this invention include many different forms of aluminum silicate. Preferred fillers are those sold by Freeport Kaolin known as OX-2, OX-3, NC, LO, HO$_2$, and W. Especially preferred are Freeport Kaolin's hydrated aluminum silicate mineral fillers known as NCF and OX-1.

The aluminum silicate can be present in amounts up to about 50 parts by weight, preferably in the range of from about 5 to 20 parts by weight.

The compositions of the invention can also include other ingredients, such as flame retardants, extenders, pigments, and stabilizers. It is an aspect of this invention to provide flame-retardant thermoplastic compositions by modifying the composition to include a flame-retardant additive in a minor proportion but in an amount at least sufficient to render the composition non-burning or self-extinguishing.

A preferred feature of the invention is a flame-retardant composition as above defined, which also includes a halogenated organic compound, a halogenated organic compound in admixture with an antimony compound, elemental phosphorus, a phosphorus compound, compounds containing phosphorus-nitrogen bonds, or a mixture of two or more of the foregoing.

When used herein, the terms "non-burning", "self-extinguishing", and "non-dripping" are used to describe compositions which meet the standards of ASTM test method D-635 and Underwriters' Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test Method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-modified alkenyl aromatic polymer composition--major proportions will detract from physical properties--but at least sufficient to render the composition non-burning or self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per 100 parts of (a), (b), and (c). Smaller amounts of compounds highly concentrated in the elements responsible for flame retardance will be sufficient, e.g., elemental red phosphorus will be preferred at about 0.5 to 10 parts by weight per hundred parts of (a), (b), and (c), while phosphorus in the form of triphenyl phosphate will be used at about 3 to 25 parts of phosphate per 100 parts of (a), (b), and (c), and so forth. Halogenated aromatics will be used at about 2 to 20 parts and synergists, e.g., antimony oxide, will be used at about 1 to 10 parts by weight per 100 parts of components (a), (b), and (c).

Among the useful halogen-containing compounds are those of the formula

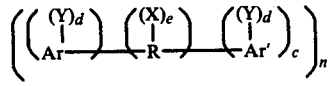

wherein n is 1 to 300 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. No. 3,647,747 and U.S. Pat. No. 3,334,154, both of which are incorporated herein by reference.

Ar and Ar' are mono- or polycarbocyclic aromatic groups such as phenylene, biphenylene, terphenylene, naphthylene, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphate compounds are selected from the group of elemental phosphorus and organic phosphonic acids, phosphonates, phosphinates, phosphonites, phosphinites, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

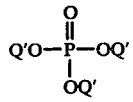

and nitrogen analogs thereof where each Q' represents the same or different radicals including hydrocarbon radicals such as alkyl, cycloalkyl, aryl, alkyl substituted aryl, and aryl substituted alkyl; halogen; hydrogen; and combinations thereof provided that at least one said Q' is aryl. Typical examples of suitable phosphates include, phenylbiddodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q' is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates with one or more isopropyl groups on some or all of the aromatic rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amines, tris(aziridinyl)phosphine oxide, or tetrakis (hydroxymethyl) phosphonium chloride. These flame-retardant additives are commercially available.

The compositions of the invention may be formed by conventional techniques, that is, by first dry mixing the components to form a premix, and then passing the premix through an extruder at an elevated temperature, e.g., 425° to 640° F. By way of illustration, aluminum silicate is put into an extrusion compounder with (a) a polyphenylene ether resin, (b) a rubber-modified alkenyl aromatic resin, and (c) flame-retardant additive(s), to produce molding pellets.

In addition, compounding should be carried out to insure that the residence time in the machine is short; that the temperature is carefully controlled; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLES I and II

A premix comprised of 50 parts by weight of poly(2,6-dimethyl-1,4-phenylene)ether resin (PPO), and 50 parts by weight of Foster-Grant's Fostuflex 834 (FG 834), a rubber-modified polystyrene containing about 9% polybutadiene rubber, was prepared by dry mixing these components with 20 parts by weight of NCF, an aluminum silicate filler from Freeport Kaolin. A similar premix was prepared using Wollastonite F-1, a calcium silicate filler from Interpace Corp., in place of NCF. Each premix was then compounded on a 28 mm twin-screw extruder at about 500° F. The respective extrudates were cooled and chopped into pellets, and the pellets were molded into test bars on a Newbury injection molding machine. Premixes corresponding to the two above containing 40 parts by weight PPO and 45 parts by weight FG-834 and additionally containing Kraton XT404, a styrene-butadiene-styrene block copolymer from Shell Chemical Co., were also prepared. The compositions and mechanical test data are set forth in the following table:

Table 1

| EXAMPLE | I | C-1* | II | C-2* |
|---|---|---|---|---|
| Composition (parts by weight) | | | | |
| Poly(2,6-dimethyl-1,4-phenylene) ether resin | 50 | 50 | 40 | 40 |
| FG-834 | 50 | 50 | 45 | 45 |
| Kraton XT404 | — | — | 15 | 15 |
| NCF | 20 | — | 20 | — |
| F-1 | — | 20 | — | 20 |
| Properties | | | | |
| Tensile yield, psi × $10^{-3}$ | 10.7 | 10.2 | 8.0 | 7.9 |
| Tensile strength, psi × $10^{-3}$ | 9.6 | 9.2 | 8.0 | 7.2 |
| Flexural modulus, psi × $10^{-3}$ | 484 | 547 | 424 | 455 |
| Flexural strength, psi × $10^{-3}$ | 16.1 | 16.7 | 11.9 | 12.1 |
| Elongation, % | 39 | 14 | 51 | 18 |
| Izod impact strength, | | | | |

Table 1-continued

| EXAMPLE | I | C-1* | II | C-2* |
|---|---|---|---|---|
| ft.lbs./in. notch | 1.09 | 1.06 | 2.0 | 1.7 |
| Gardner impact strength, in./lbs. | 26 | 4 | 38 | 6 |

*Comparative Example

It can be seen from the above table that compositions containing NCF, a hydrated aluminum silicate mineral filler, have better toughness than those compositions containing Wollastonite F-1, a calcium silicate mineral filler.

EXAMPLES III–IX

Employing the procedure used in the preparation of Examples I and II, compositions comprised of 50 parts by weight PPO, 50 parts by weight FG-834, and 20 parts by weight aluminum silicate mineral filler were prepared. The mineral fillers, all of which are supplied by Freeport Koalin, were either hydrated, calcined, or different sizes, e.g., coarse, fine, or medium. The compositions and mechanical test data are set forth in the following table:

Table 2

| Example | Filler | Aluminum Silicate Type | Tensile Yield (psi × 10⁻³) | Elongation (%) | Flexural Modulus (psi × 10⁻⁵) |
|---|---|---|---|---|---|
| III | OX-1 | Fine, delaminated, hydrated | 10.6 | 56 | 4.7 |
| IV | OX-2 | Fine, calcined | 10.6 | 31 | 4.5 |
| V | OX-3 | Coarse hydrated | 10.4 | 21 | 4.4 |
| VI | NC | Delaminated, hydrated | 10.9 | 23 | 5.1 |
| VII | LO | Coarse hydrated | 10.4 | 16 | 4.7 |
| VIII | HO₂ | Medium size hydrated | 10.4 | 24 | 4.6 |
| IX | W | Calcined | 10.4 | 17 | 4.4 |

As shown above, compositions containing aluminum silicate fillers such as OX-1 and NCF (Example I) have better toughness retention than compositions comprised of coarse hydrated or calcined aluminum silicate fillers.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. An improved thermoplastic molding composition which comprises:
   (a) from about 1 to 99 parts by weight of a polyphenylene ether resin and
   (b) from about 99 to 1 parts by weight of a rubber-modified alkenyl aromatic resin,
wherein the improvement comprises the molding composition containing about 50 or less parts by weight of aluminum silicate, based on (a) plus (b).

2. The molding composition of claim 1 wherein the alkenyl aromatic resin is a rubber-modified polystyrene.

3. The molding composition of claim 2 wherein the styrene resin is a polybutadiene modified polystyrene.

4. The molding composition of claim 1 wherein said rubber is a rubbery interpolymer comprises 10–90 mole percent of ethylene, 10–90 mole percent of an alpha-olefin having 3 to 16 carbon atoms, and 0.1–12 mole percent of a polyene that is a non-conjugated cyclic or open-chain diene having 5 to 20 carbon atoms.

5. The molding composition of claim 4 wherein the alpha-olefin is propylene.

6. The molding composition of claim 1 wherein the polyphenylene ether resin is selected from compounds of the formula

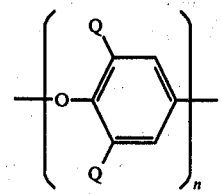

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

7. The molding composition of claim 1 wherein the alkenyl aromatic resin is prepared from a monomer selected from the group consisting of styrene, α-methylstyrene, bromo-styrene, chloro-styrene, divinylbenzene, vinyl naphthalene, and vinyltoluene.

8. The molding composition of claim 1 wherein said composition contains a mineral filler comprised of hydrated aluminum silicate.

9. The molding composition of claim 1 wherein said composition contains from about 5 to 20 parts by weight of aluminum silicate.

10. The molding composition of claim 1 wherein said composition includes a flame-retardant amount of a flame-retardant additive.

11. The molding composition of claim 10 wherein said flame-retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

12. An improved thermoplastic molding composition which comprises:
(a) from about 1 to 99 parts by weight of a polyphenylene ether resin and
(b) from about 99 to 1 parts by weight of an alkenyl aromatic resin modified with a rubbery interpolymer which comprises 10–90 mole percent of ethylene, 10–90 mole percent of an alpha-olefin having 3 to 10 carbon atoms, and 0.1–12 mole percent of a polyene that is a non-conjugated cyclic or open-chain diene having 5 to 10 carbon atoms,
wherein the improvement comprises the molding composition containing about 50 or less parts by weight of aluminum silicate, based on (a) plus (b).

13. The molding composition of claim 12 wherein said polyphenylene ether resin is poly(2,6-dimethyl-1,4-phenylene) ether.

14. The molding composition of claim 12 wherein the polyene is propylene.

15. The molding composition of claim 11 wherein said alkenyl aromatic resin is styrene and said rubbery interpolymer is present at a ratio between 4:1 and 25:1 by weight of styrene to rubbery interpolymer.

16. The molding composition of claim 12 wherein said rubbery interpolymer comprises 10–90 mole percent of ethylene, 10–90 mole percent of propylene, and 0.1–12 mole percent of 5-ethylidene-2-norbornene.

17. The molding composition of claim 12 wherein said rubbery interpolymer comprises 10–90 mole percent of ethylene, 10–90 mole percent of propylene, and 0.1–12 mole percent of 1,4-hexadiene.

18. The molding composition of claim 12 wherein said rubbery interpolymer comprises 10–90 mole percent of ethylene, 10–90 mole percent of propylene, and 0.1–12 mole percent dicylcopentadiene.

19. The molding composition of claim 12 wherein the composition contains from about 5 to 20 parts by weight of mineral filler.

20. An improved thermoplastic molding composition which comprises:
(a) from about 1 to 99 parts by weight of a polyphenylene ether resin;
(b) from about 99 to 1 parts by weight of an alkenyl aromatic resin modified with a rubbery interpolymer which comprises 10–90 percent of ethylene, 10–90 mole percent of an alpha-olefin having 3 to 10 carbon atoms, and 0.1–12 mole percent of a polyene that is a non-conjugated cyclic or open-chain diene having 5 to 10 carbon atoms; and
(c) a flame-retardant amount of a flame-retardant additive, wherein the improvement comprises the molding composition comprising about 50 or less parts by weight of aluminum silicate, based on (a) plus (b).

21. The molding composition of claim 18 wherein said flame-retardant additive is a halogenated organic compound, a halogenated organic compound in admixture with an antimony compound, elemental phosphorus, a phosphorus compound or compounds containing phosphorus-nitrogen bonds, or a mixture of two or more of the foregoing.

22. The molding composition of claim 20 wherein said flame-retardant additive comprises a mixture of an organic bromine-containing compound with antimony oxide.

23. The molding composition of claim 20 wherein said flame-retardant additive is triphenylphosphate.

24. The molding composition of claim 20 wherein said flame-retardant additive is comprised of a mixture of triaryl phosphates wherein one or more aryl groups are substituted by one or more isopropyl groups.

25. An improved thermoplastic molding composition which comprises:
(a) from about 1 to 99 parts by weight of a polyphenylene ether resin and
(b) from about 99 to 1 parts by weight of a rubber-modified alkenyl aromatic resin,
wherein the improvement comprises the molding composition containing about 50 or less parts by weight of hydrated aluminum silicate, based on (a) plus (b).

26. The molding composition of claim 1 wherein the aluminum silicate is fine size, delaminated, hydrated aluminum silicate.

27. The molding composition of claim 25 wherein said composition includes a flame-retardant amount of a flame-retardant additive.

28. A method for enhancing the toughness retention of thermoplastic molding compositions comprised of from about 1 to 99 parts by weight of a polyphenylene ether resin and from about 99 to 1 parts by weight of a rubber-modified alkenyl aromatic resin, which comprises adding about 50 or less parts by weight of aluminum silicate, based on the total weight of the polyphenylene ether resin and the rubber-modified alkenyl aromatic resin.

29. The method of claim 28 wherein the aluminum silicate is hydrated aluminum silicate.

30. The method of claim 28 wherein the aluminum silicate is fine size, delaminated, hydrated aluminum silicate.

* * * * *